United States Patent
Elsässer et al.

[11] Patent Number: 6,062,268
[45] Date of Patent: May 16, 2000

[54] TUBE ELEMENT WITH ONE METAL BELLOWS

[75] Inventors: Fabian Elsässer, Neulingen; Tom Krawietz, Birkenfeld, both of Germany

[73] Assignee: Witzenmann GmbH Metallschlauch-Fabrik Pforzheim, Pforzheim, Germany

[21] Appl. No.: 09/157,950

[22] Filed: Sep. 22, 1998

[30] Foreign Application Priority Data

Sep. 23, 1997 [DE] Germany .............................. 197 42 875
Mar. 18, 1998 [EP] European Pat. Off. .............. 98104867

[51] Int. Cl.⁷ .................................................. F16L 11/16
[52] U.S. Cl. .......................... 138/121; 138/109; 138/131; 138/135; 181/228; 181/282
[58] Field of Search ...................... 138/118, 120, 138/121, 109, 134, 135, 131, 122; 181/212, 227, 228, 247, 282

[56] References Cited

U.S. PATENT DOCUMENTS

| 3,773,087 | 11/1973 | Katayama | 138/120 |
| 3,862,878 | 1/1975 | Azuma | 138/110 |
| 4,315,558 | 2/1982 | Katayama | 138/120 |
| 4,674,171 | 6/1987 | DeCell et al. | 138/177 |
| 5,660,419 | 8/1997 | Kim | 138/109 |
| 5,813,438 | 9/1998 | Reed | 138/121 |
| 5,819,807 | 10/1998 | Reed | 138/121 |
| 5,901,754 | 5/1999 | Elässe et al. | 138/118 |

FOREIGN PATENT DOCUMENTS

| 0 770 808 A1 | 5/1997 | European Pat. Off. . |
| 44 38 213 | 5/1996 | Germany . |
| 196 41 963 | 10/1997 | Germany . |

*Primary Examiner*—James Hook
*Attorney, Agent, or Firm*—Venable; George H. Spencer; Catherine M. Voorhees

[57] ABSTRACT

A tube element especially for exhaust systems and exhaust recirculation systems of combustion engines in vehicles which includes at least one helically or annularly corrugated bellows provided with cylindrical end fittings on each end of the bellows; a flexible hose made of metal and situated on an interior surface of the bellows; and a braiding hose made of metal wire which coaxially encloses an exterior surface of the bellows. The braiding hose being placed on the cylindrical end fittings together with the flexible hose so that the flexible hose and the braiding hose are connected firmly and at least indirectly. The braiding hose is installed in a state of pre-setting so that the braiding hose has a reduced radial cross-section which in frictional contact with the exterior surface of the bellows.

21 Claims, 6 Drawing Sheets

TUBE ELEMENT WITH ONE METAL BELLOWS

CROSS REFERENCE TO RELATED APPLICATION

This application claims the priority of German Application No. 197 42 875.4 filed Sep. 23, 1997 and European Application No. 98 104 867.1 filed Mar. 18, 1998, which are incorporated herein by reference.

BACKGROUND OF THE INVENTION

The invention is directed to a tube element, especially for exhaust systems and exhaust recirculation systems of combustion engines in vehicles, and more particularly to a tube element including a flexible hose made of metal having cylindrical end fittings, at least one helically or annularly corrugated bellows equipped with the cylindrical end fittings, and a braiding hose made of metal wire, which is fitted in a coaxial position to the bellows on its exterior surface. The bellows and the braiding hose are connected firmly and at least indirectly, and the inside diameter of the hose corresponds in general with the free outside diameter of the bellows.

The bellows are manufactured either absolutely tight from a pipe section or practically tight by means of helical winding of a pre-profilated metal strip. The tube elements are used for the purpose of absolutely or practically fluid-tight, particularly gas-tight, flexible connection with two pipe systems, each pipe system being connected with one end of a tube element and, in a special case, for the flexible connection within the exhaust system of a motor vehicle, where the tube elements are used for the purpose of allowing movement, especially of the engine, and for decoupling the engine vibrations from the passenger compartment.

In known tube elements, the exterior braiding hose is usually applied for the purpose of supporting the bellows against axial tensile stress. Designs have been developed in which existing tube elements do not have to carry out such axial support themselves as separate components of the exhaust system provide the needed support. As an example, existing tube elements have been installed before or behind catalytic converters, with the hoses being supported by suspensions. This allows the use of the braiding hose for other purposes, since it no longer has to carry out a supporting function.

In the case described above, however, the exterior braiding hose, which no longer guarantees an axial support, is situated at a distance from the bellows, with the exception at its end fittings, as the hose and bellows would be in direct contact at both end fittings. But over most of its length, the hose would be in a more or less variable position from the bellows. It is therefore unable to carry out other functions than those already mentioned. It is, in particular, unable to exert a direct influence on the vibrations of the bellows or on the functions of the tube element itself, which include the transfer of vibrations between the adjacent pipe systems as well as the damping of resonance vibrations by the bellows or the tube element. As a consequence of such vibrations, secondary acoustic effects may occur which could cause a disturbing sensation to the passengers of the vehicle.

SUMMARY OF THE INVENTION

This invention therefore has been made for the purpose of modifying a tube element of the design described above in order to improve the vibration characteristics of the bellows and also of the tube element by reducing the secondary acoustic effects and increasing the duration of its service life without affecting the movability of the tube element. This is also accomplished without installation of additional parts which would cause an increase in weight.

This task has been solved according to the invention by installing the exterior braiding hose in a state of pre-setting so that the hose has a reduced cross-section. As a result of the reduction of its radial cross-section, the hose causes friction in at least local contact with the exterior plies of the bellows or conveying component which form the free outside diameter of the conveying component.

According to the invention, the exterior braiding hose is able to carry out damping functions with respect to the bellows or to several bellows in serial arrangement which are connected with each other by intermediate pipes, so that the tube element no longer transfers induced vibrations or that the disharmonious vibration characteristics of the tube element avoid the occurrence of such resonance vibrations. For this purpose, the hose is pressed effectively into direct contact with the external crests of the bellows and/or an intermediate pipe.

The damping effect of the exterior braiding hose can be adapted easily to individual requirements by the selection of an adequate pre-setting force as well as by the determination of the size and location of the zones of friction-causing contact between the hose and the bellows in order to obtain a sufficient damping rate, and to avoid excessive frictional contact between the hose and the bellows, which would cause wear.

An advantage of the damping braiding hose according to the invention is that the disadvantages of existing tube elements can be eliminated. Existing tube elements are of higher softness and lower rigidity since they do not have to carry out supporting functions, and therefore show a natural resonance in the engine speed range, which can produce a correspondingly loud noise. The elimination of noise can be achieved in a simple manner by selecting a bellows with disharmonious resonance characteristics.

Another benefit of the pre-setting of the exterior braiding hose towards the bellows is that the braiding is unable, due to the permanent and elastically flexible contact, to hit the bellows during stress alternations or vibration amplitudes, which would cause not only noise but also a correspondingly high stress to the braiding hose.

The softness of the braiding hose allows for a considerable reduction of weight and costs, due to the particular hose characteristics applied, such as covering rate, number and diameter of wires, since these characteristics can be reduced according to the lower demands on the supporting capacity of the hose. The resulting relatively loose integration of the hose also leads to an axial flexibility in the direction of both pressure and tension, thus avoiding restrictions to the overall movability of the tube element.

In this respect, the invention does not require any other components than those already described, thus avoiding an increase in weight of the tube element. There is, however, the possibility of installing at least two bellows in axial sequence, if required under specific conditions. In this case, two neighboring bellows would be connected by an intermediate plain section whose inside diameter generally corresponds with the free inside diameter of the adjacent bellows.

In a first version based on this invention, it can be provided that the exterior braiding hose is, in part, subject to a permanent deformation by means of axial compressing during its installation, with the result that its outside diameter is greater than the free outside diameter of the bellows. After this increase in diameter which is, to the utmost extent, a process of plastic transformation, the bellows will be installed. In exterior braiding hoses whose length exceed a specific minimum value which results from the parameters of the individual hose, this measure has the effect that the hose contracts in the zones of the larger diameter, thus forming one or several annular zones of friction-causing contact between the braiding hose and the bellows, depending on the length of the hose.

The compressing of the braiding hose provides another advantage. The braiding hose now has greater permissible manufacturing tolerances in respect to its axial length, since the desired final length can be adjusted by means of the compressing process so that potential differences in length are negligible.

The tube element according to this invention does not require the usually applied accessories such as slotted end sleeves or wire mesh layers, which were used in traditional versions in order to avoid or to compensate hitting of the braiding.

In another version based on this invention, the exterior braiding hose can be subject to reductions of its cross-section in precisely determined spots, especially if not only one but several of such spots are provided for the purpose of increasing the damping characteristics of the tube element. Furthermore, the exterior braiding hose can have an intrinsic structure or profilation which may include, for example, local indentations distributed evenly over the length of the hose. These indentations can be applied to the exterior braiding hose previous to its installation by an appropriate embossing procedure and allow for a precise determination of position and size of the spots of friction-causing contact between the bellows and the hose.

According to a third version based on this invention, it can be provided that the exterior braiding hose has at least one profilated corrugation parallel to its longitudinal axis. It may be appropriate to employ several profilated corrugations which are distributed evenly over the circumference of the exterior braiding hose. Such profilated corrugations can be applied to a braiding hose by means of an at least local plastic transformation, using appropriate forming tools. As an effect of these corrugations, the braiding hose is kept from hitting the bellows over its total length, even if the bellows is compressed, i.e. if axial compression occurs, during operation.

BRIEF DESCRIPTION OF THE DRAWINGS

Further features of the invention and their details are included in the following description of versions which are shown in the drawing. The drawing consists of.

DETAILED DESCRIPTION OF THE INVENTION

Figure 1:
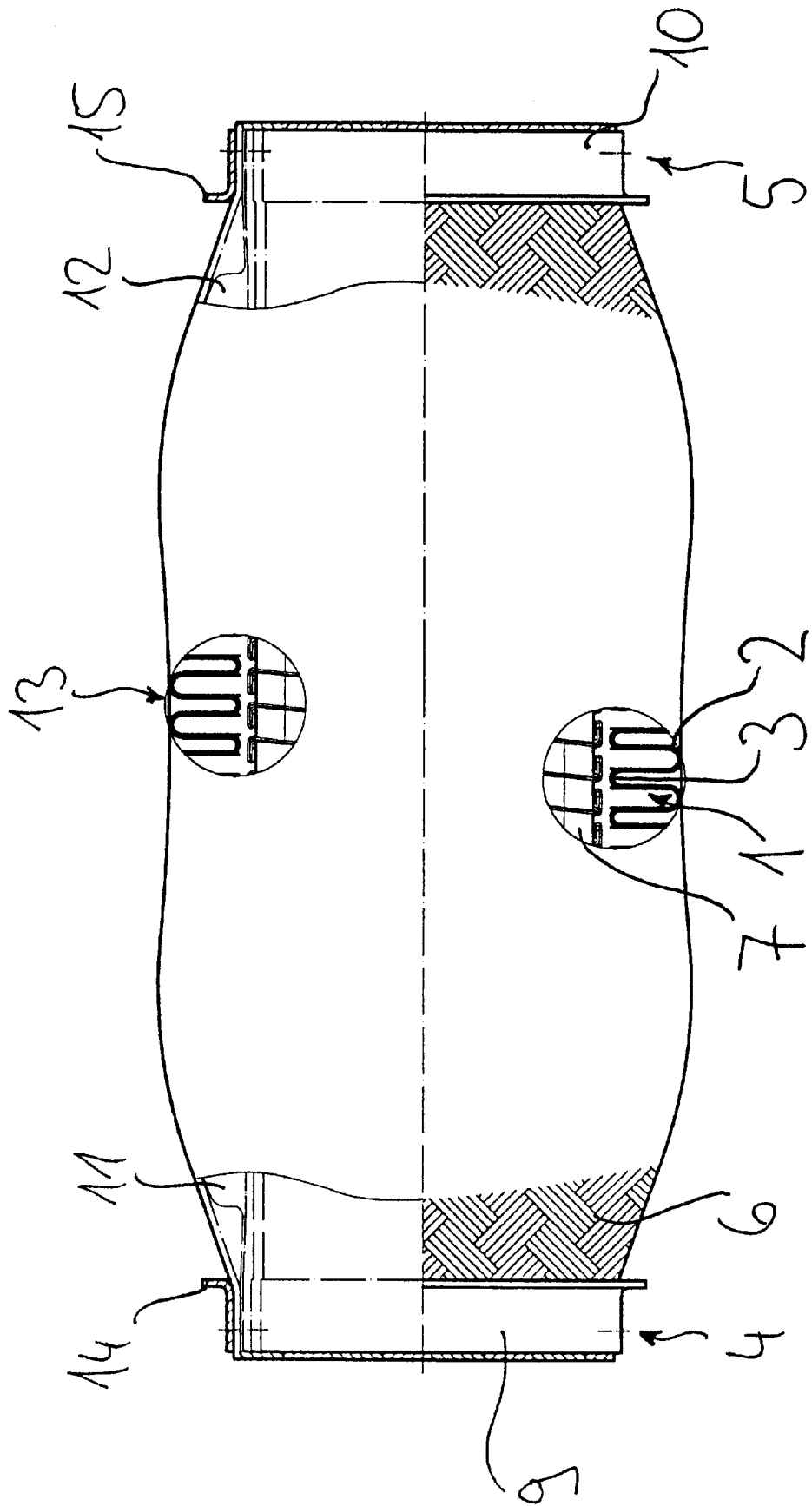
FIG. 1 is a side view, partly in axial section, showing a first version of a tube element according to the invention, especially for exhaust systems and exhaust gas recirculation systems of vehicles.

The tube element shown in FIG. 1 includes a conveying component, being an annularly corrugated bellows 1, with the bellows corrugations forming external crests 2 and internal crests 3. The bellows 1 is equipped with cylindrical end fittings 4, 5, with the end of an exterior braiding hose 6, which is used as an exterior liner, being placed on the end fittings together with a flexible hose with interlocked profile 7, which is made by winding of pre-profilated strip layers and which is situated on the interior surface of the bellows. Exterior braiding hose 6 and flexible hose 7 preferably are made of metal.

On its exterior surface, the bellows 1 is connected with the exterior braiding hose 6 at both ends by means of exterior supporting rings 9, 10 at the cylindrical end fittings 4, 5 of the bellows 1.

The ends of parts 4, 6, 7 and 9 on one side and parts 5, 6, 7 and 10 on the other side can be connected in a usual way by means of spot welding or by means of press-fitting these parts from inside to outside and/or from outside to inside.

The tube element can be fixed to continuing pipes or hoses, which are not shown in the figure, on both ends by means of snap-on connections with the end fittings formed in the process described before.

The sides of the exterior supporting rings 9 and 10 which face the center of the bellows 1 have an extended section or rim 14, 15 in order to avoid an end pressure towards the exterior braiding hose 6.

The previously described basic structure of the tube element according to FIG. 1 can be found in the versions according to FIGS. 2 to 6. For this reason, the descriptions of these versions do not refer to the details of this basic structure once more but use the numbers introduced in FIG. 1 which will always apply to the same parts.

Figure 2:
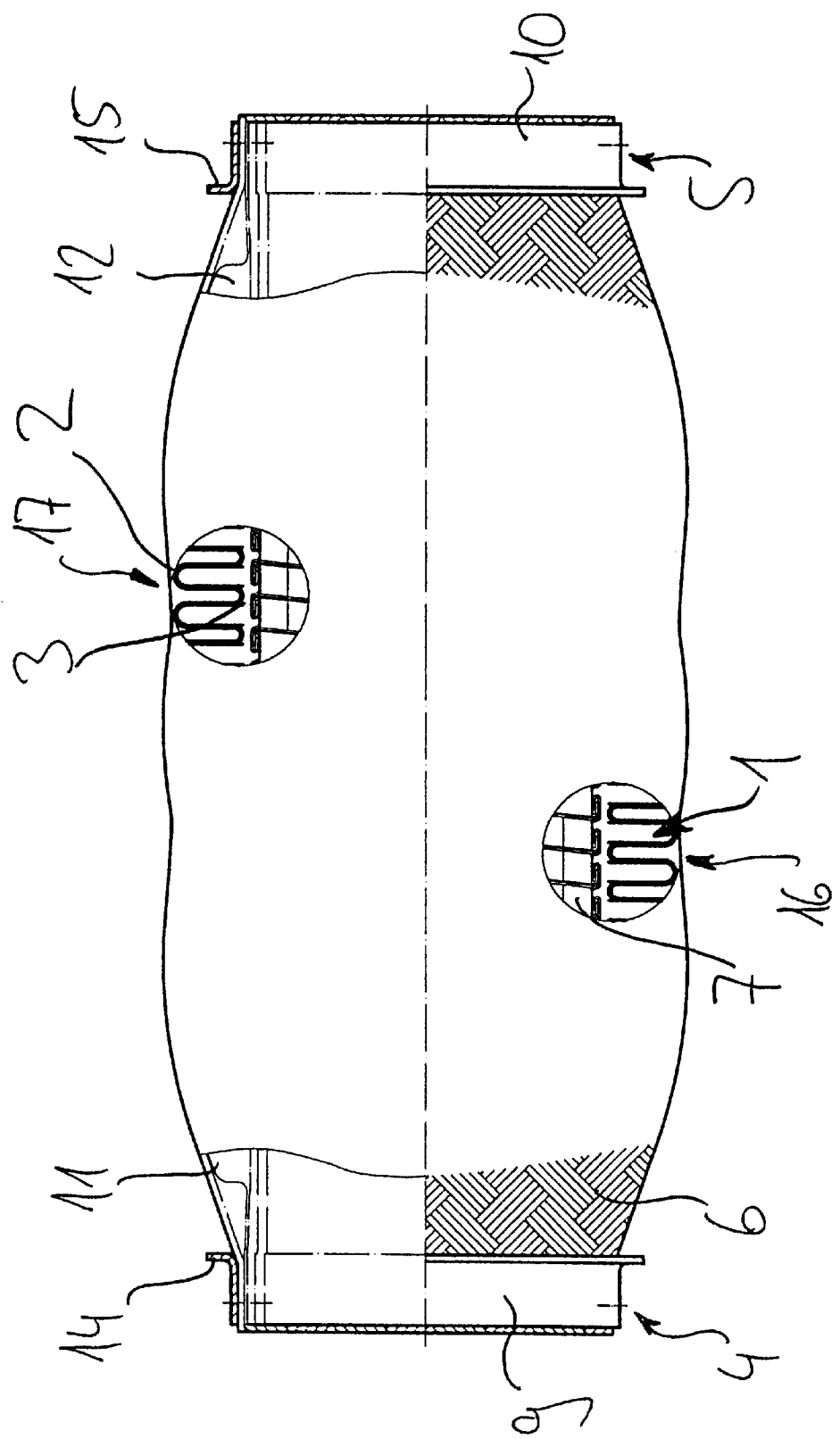
FIG. 2 shows a modified version of this type of tube element, according to the invention, also in a side view, partly in an axial section.

In both the version according to FIG. 1 and the version according to FIG. 2, the exterior braiding hose covers the distance between end fitting 4 and end fitting 5. The diameter of braiding hose 6 within this zone is adapted only approximately to the free outside diameter of the bellows 1 and is therefore respectively greater. In the individual exterior end zones, the metal bellows 1 has external end rims 11, 12 whose outside diameter lies approximately between the outside diameter of the remaining part of the corrugated bellows section and the outside diameter of the neighboring cylindrical end fitting. The exterior braiding hose 6 is also adapted to this diameter.

There is only one further zone in which the outside diameter of the metal bellows 1 is equal to the inside diameter of the exterior braiding hose 6. This zone is the axially central zone 13, where the cross-section of braiding hose 6 is reduced in one spot of an annular cross-section. This feature allows for contact between braiding hose 6 and bellows 1 under pre-setting. Exterior braiding hose 6 has an expanded section between the external crests with reduced outside diameters of a medium height 11, 12 and the spot of reduced cross-section 13. In this expanded section, there is a distance between braiding hose 6 and the external crests 2 of metal bellows 1.

As explained before, the exterior braiding hose 6 is in a frictional contact with metal bellows 1 in the zone of the local cross-section reduction 13 which has a disharmonizing effect on the natural frequency of the metal bellows and also a vibration-damping effect due to the contact. The advantageous result of these features is a high reduction of noise.

In contrast to the version according to FIG. 1, the tube element version according to FIG. 2 has two annular local cross-section reductions 16, 17 and therefore has three expanded sections. The expanded sections are located between the external crest of medium height 11 and the first annular cross-section reduction 16, between the first cross-section reduction 16 and the second cross-section reduction 17 and between the other external crest of medium height 12 and the second cross-section reduction 17.

It is evident that, under an equal pre-setting force of the braiding towards the metal bellows, the version according to FIG. 2 has a higher damping effect.

The parameters of exterior braiding hoses have to provide specific properties which will allow for the desired radial reduction of the cross-section by means of axial compressing for the purpose of pre-setting: First, the braiding angle, i.e. the angle of the braiding wires towards the longitudinal axis of the hose should preferably lie between 50° and 70°. Additionally, the number of single braidings in such hose should lie between 36 and 48, with the number of wires per braiding lying between 4 and 9. Finally, a covering rate of the braiding hose lying between 35% and 75% of the total hose surface is recommendable. Compliance with these characteristic braiding hose specifications allows the reduction of cross-section in the braiding provided by the invention by means of simple compressing, without requiring special accessories neither during the compressing process nor after installation, since the reduction of cross-section and the pre-setting process will take place automatically.

Figure 4:
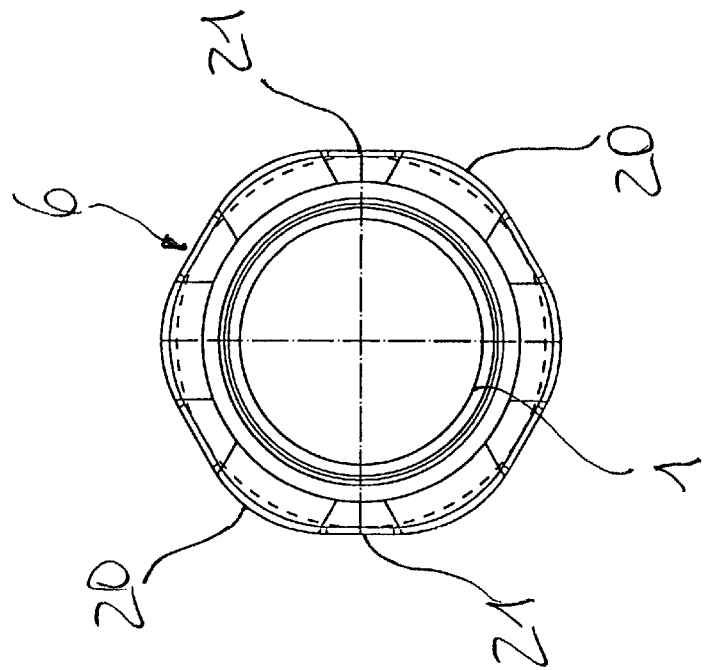
FIG. 4 is an axial front view of the tube element shown in FIG. 3.
Figure 3:
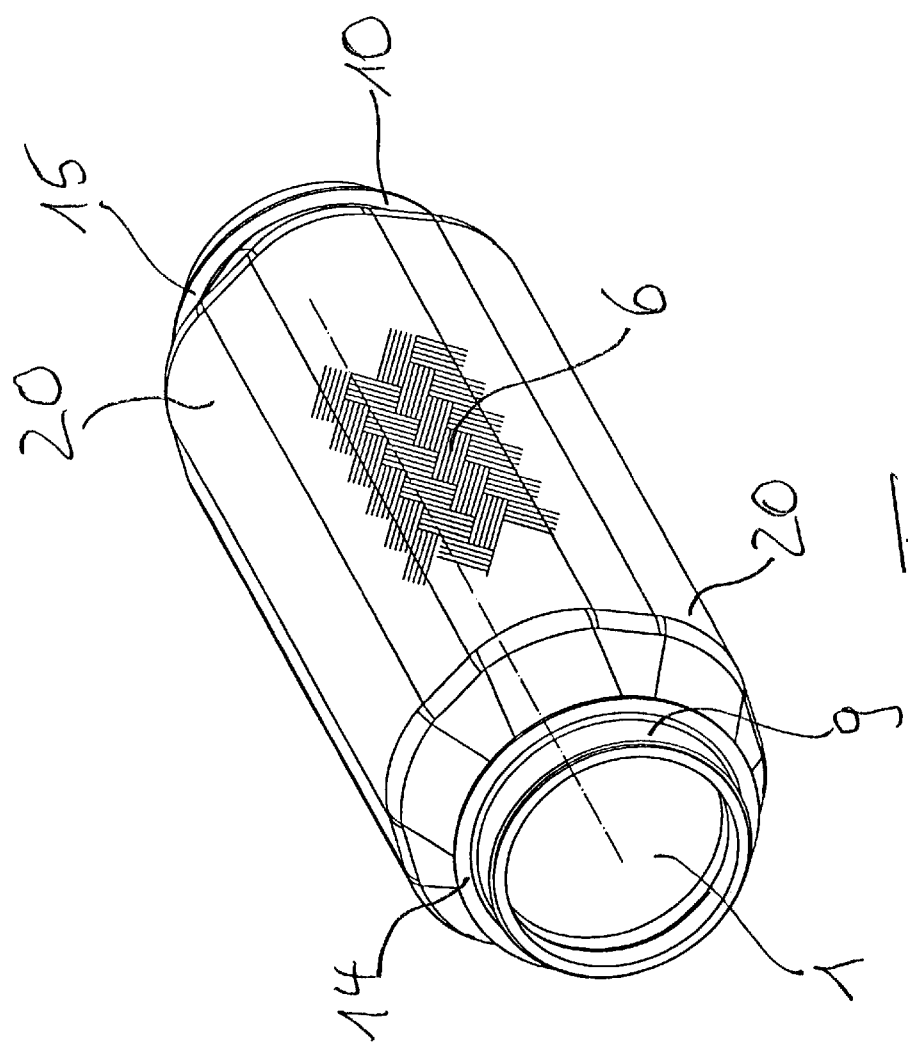
FIG. 3 is a perspective view of another version of a tube element according to the invention.

Contrary to the versions described before, exterior braiding hose 6 of the versions according to FIGS. 3 and 4 has profile corrugations 20 which run parallel to the longitudinal axis of braiding hose 6 and are arranged evenly over its exterior surface. There is a distance between these corrugations and the exterior cross-section of the bellows 1, whereas the grooves 21 of corrugations 20 of the braiding hose 6 are in direct contact with the exterior of bellows 1 over its total length. This design allows for the damping effect in these contact zones and guarantees that the parts do not hit each other.

Figure 5:
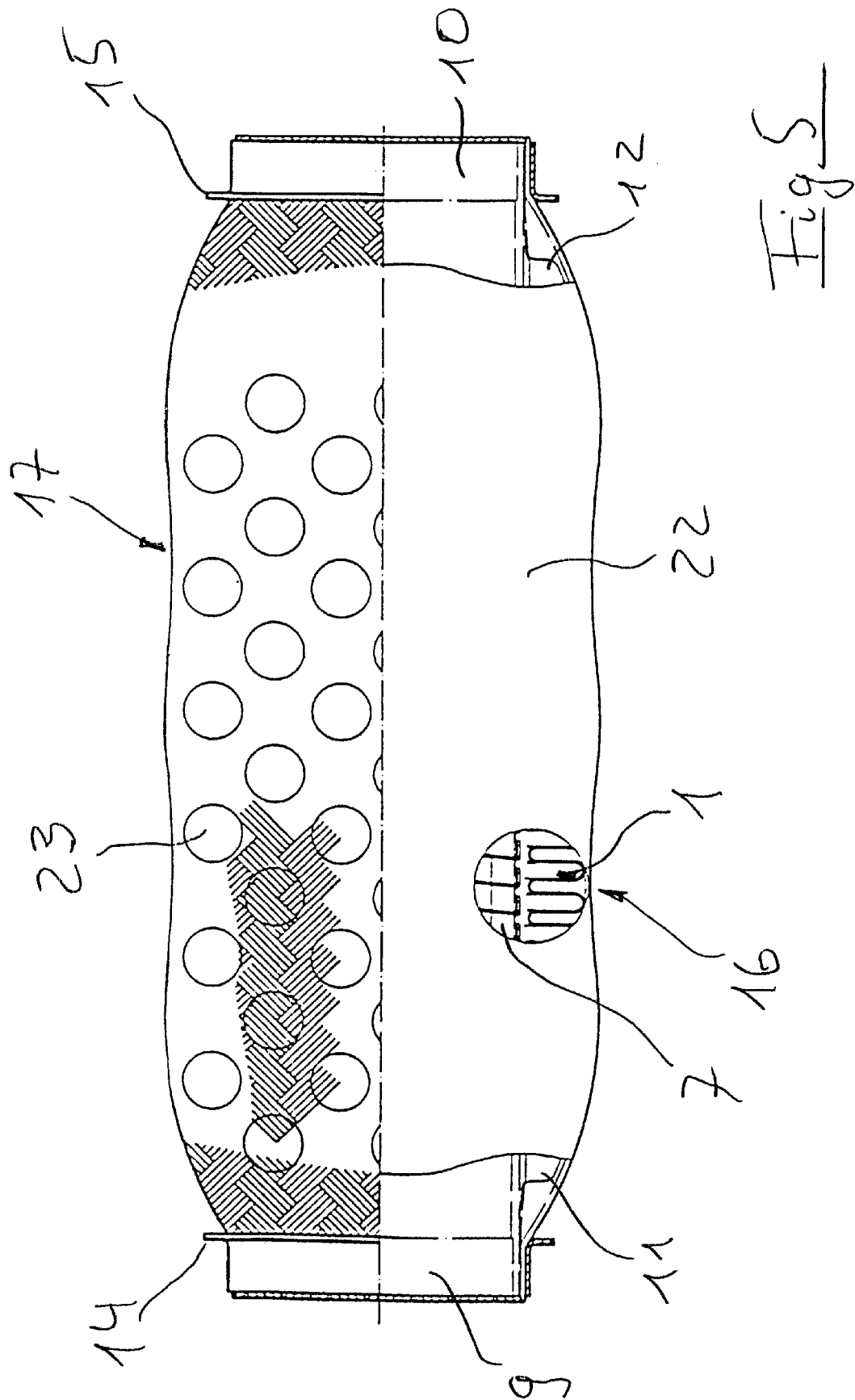
FIG. 5 is a side view, partly in section, showing a modified version of the tube element according to FIG. 2.

In the version according to FIG. 5, the tube element according to FIG. 2 is modified as follows: the exterior braiding hose 22 has additional local indentations 23 resulting from a process of permanent deformation. The arrangement of these indentations allows for an easy identification of the spots of frictional contact between bellows 1 and the hose 22 with respect to position and size.

Figure 6:
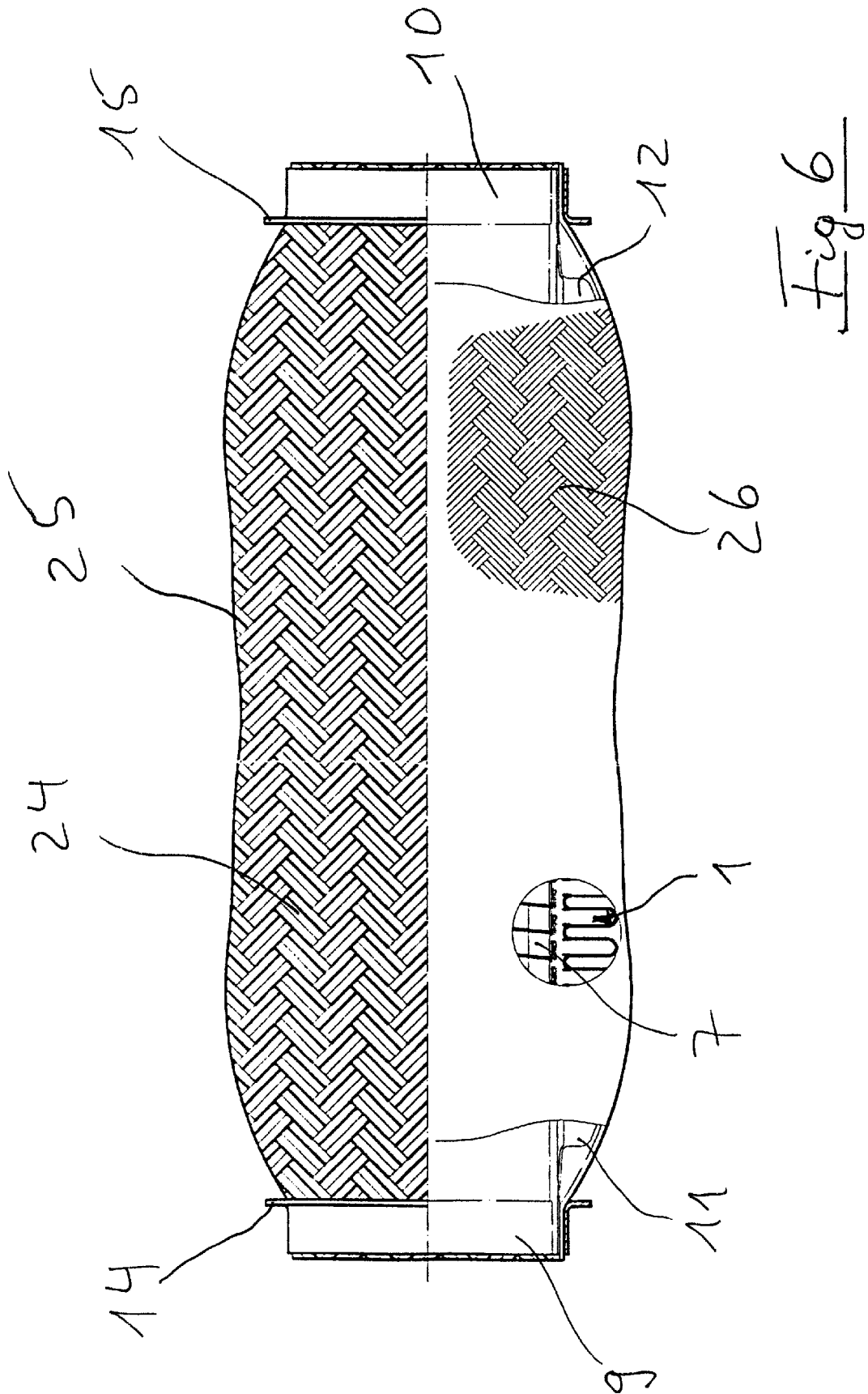
FIG. 6 is a further modified version of the tube element according to FIG. 2.

FIG. 6 shows the tube element according to FIG. 2 with the following modifications: the exterior braiding hose 24 is manufactured with the addition of glass fibers 25 and/or is coated with a glass fiber braiding 26 which has a favorable effect on the sliding properties in respect to a reduction of wear.

Figure 7:
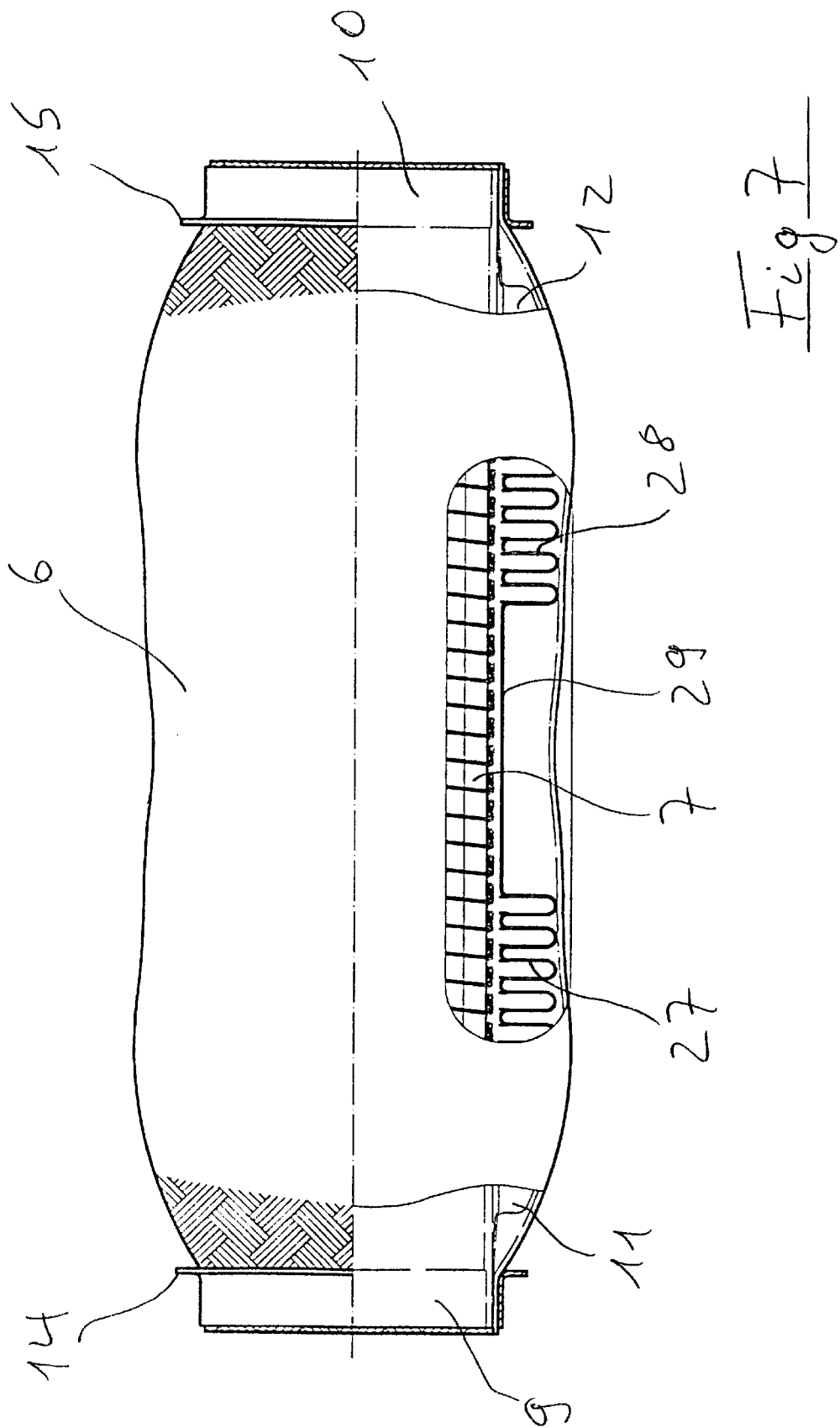
FIG. 7 shows yet another modified version of the tube element according to FIG. 2.

Finally, FIG. 7 shows a modified version of the tube element according to FIG. 2, in which the interior conveying element does not include a single, annularly corrugated bellows but two bellows with an intermediate plain section 29. In this way, the manufacturing costs for the tube element and its bending behavior can be influenced especially when longer tube elements are to be used.

Materials appropriate for the manufacturing of braiding hoses are, for example, steel wire or stainless steel wire, spring wire, ceramic fibers or plastic materials of high temperature resistance. It is also possible to provide a combination of several materials in one single braiding or in a braiding hose. This means that, within the scope of this invention, the optimum adaptation of the braiding properties is possible by using various materials and different geometrical structures of the exterior braiding, i.e. various types of diameter reduction.

With respect to the design of the end fittings 4, 5 and particularly the corresponding part of the exterior surface of the exterior braiding hose, it is advantageous to use a type of connection in which a supporting metal ring 9, 10 is included from outside and free of clearance into the firm connection between the exterior braiding hose 6 and the cylindrical ends of the bellows 1.

Additionally, it can be provided that the end of the supporting ring which faces the corrugated section of the adjacent bellows has a, generally conical, expanded section 14, 15 in order to avoid a friction-causing edge between a supporting ring 9, 10 and the braiding hose 6.

Furthermore, it is particularly advantageous if at least the first, but especially the first two external crests of bellows 1 situated next to the cylindrical end fittings 4, 5 have a reduced outside diameter which is situated approximately between the outside diameter of the remaining part of the corrugated section of the bellows and the outside diameter of the neighboring cylindrical end fitting 4, 5. This design not only avoids abrupt changes in diameter, but establishes the arched exterior shape of the exterior braiding hose in the zones of the end fittings. The arched exterior shape continues until the spot or the spots of reduced cross-section of the braiding hose are reached.

Finally, it can be provided that exterior braiding hose 6 includes corrosion- and temperature-resistant material or is equipped with a liner of such a material particularly on its interior surface, with the material of the liner having good sliding characteristics in order to keep the wear caused by friction between the tube element and the hose as low as possible. For the same purpose, the exterior braiding hose can be manufactured with the addition of glass fibers and/or can be covered with a glass fiber braiding or mesh.

Furthermore, it is appropriate that the inside diameter of that cylindrical end fitting 4, 5 that is connected with the one end of the exterior braiding hose 6 is greater than the inside diameter of the remaining longer section of the tube element. This allows for a connection between this end and the adjacent pipe or flexible hose 7 by pushing the end onto the pipe, so that the interior cross-section of the adjacent pipe corresponds to the utmost extent with the inside cross-section of the tube element which remains for the gas flow.

The tube element based on this invention can also be modified according to an already known principle. The resulting tube element would be equipped with a braiding hose of metal which is situated on the interior surface of the tube element, and with one end of the interior braiding hose being firmly connected with one cylindrical end of the tube element.

This interior braiding hose is used as a guide to the exhaust gas flow inside the bellows in order to avoid vortices at the internal crests of the bellows corrugations which may cause flowing noise or a secondary emission of sound. There will also be a reduction of the thermal stress to the internal crests of the bellows corrugations which will provide an increase in the service life of the bellows.

If this version of the tube element is selected and is applied in combination with a cylindrical end fitting of increased diameter, it is advantageous that the first internal crest of the bellows situated next to the cylindrical end fitting has an inside diameter which lies to the utmost extent between the inside diameter of the cylindrical end fitting and the free inside diameter of the bellows. According to this principle, the interior braiding hose is installed in the free inside diameter of the bellows with a transition bend. This design avoids excessive stress due to an abrupt change in diameter next to the end fitting.

Finally, a flexible hose with interlocked profile which includes metal hose made by helical winding of profilated strip layers can be provided instead of the interior braiding. This hose is applied particularly for the thermal insulation of the bellows from the hot exhaust gas flow.

For this purpose, the tube element and especially the bellows can have a single-ply or a multi-ply structure, depending on the rate of flexibility required. In multi-ply versions, the individual plies can be made of different materials, for example in respect to corrosive effects.

With regard to the cross-section of the tube element, not only circular versions but also oval versions can be provided if this should be desirable in order to save space, for example.

It can be summarized that this invention has the following advantage: the frictional contact of the exterior braiding hose with the bellows allows for a considerable reduction of noise, especially due to the disharmonizing effect on the natural frequency of the bellows, and, as a consequence of the permanent elastic contact, the two components will never or almost never hit each other. Finally, the exterior braiding hose does not act as an obstacle to the tube element in the cases of axial pull and the resulting changes of length, at least in the versions according to FIGS. 1, 2 and 5 to 7.

It will be understood that the above description of the present invention is susceptible to various modifications, changes and adaptations, and the same are intended to be comprehended within the meaning and range of equivalents of the appended claims.

What is claimed is:

1. A tube element for exhaust systems and exhaust recirculation systems of combustion engines in vehicles, said tube element comprising:
   at least one helically or annularly corrugated bellows provided with cylindrical end fittings on each end of the bellows;
   a flexible hose being made of metal and situated on an interior surface of the bellows; and
   a braiding hose made of metal wire which is coaxially fitted to an exterior surface of the bellows, said braiding hose being placed on the cylindrical end fittings together with the flexible hose, said flexible hose and said braiding hose being connected firmly and at least indirectly, wherein said braiding hose is installed in a state of pre-setting so that the braiding hose has a reduced radial cross-section which is in frictional contact with the exterior surface of the bellows.

2. The tube element according to claim 1 wherein the exterior braiding hose is wound at a braiding angle lying in the range between 50° and 70° with respect to the longitudinal axis of the braiding hose.

3. The tube element according to claim 1 wherein the number of single braidings in the exterior braiding hose lies between 36 and 48.

4. The tube element according to claim 3, wherein the number of metal wires in the single braidings of the exterior braiding hose lies between 4 and 9.

5. The tube element according to claim 1, wherein the covering rate of the exterior braiding hose lies between 35% and 75% of the total surface of the bellows.

6. The tube element according to claim 1, wherein the exterior braiding hose is subject to a permanent deformation by means of axial compressing during the installation of the braiding hose, with the result that the outside diameter of the braiding hose is greater than the free outside diameter of the bellows.

7. The tube element according to claim 1, wherein the exterior braiding hose has an interior surface with profile corrugations which comes in contact with portions of the bellows, the interior surface consists of local indentations formed in a process of permanent deformation.

8. The tube element according to claim 7, wherein the indentations are distributed evenly over the length of the braiding hose.

9. The tube element according to claim 1, wherein the exterior braiding hose has at least one profile corrugation parallel to its longitudinal axis.

10. The tube element according to claim 9, wherein the exterior braiding hose has several profile corrugations, the corrugations being distributed evenly over the circumference of the exterior braiding hose.

11. The tube element according to claim 1, further comprising a supporting metal ring attached to the cylindrical end fittings, said supporting metal ring being attached from outside and free of clearance and creating a firm connection between the bellows and the exterior braiding hose.

12. The tube element according to claim 11, wherein the end of the supporting ring which faces the corrugated section of the adjacent bellows has a generally conical expanded section.

13. The tube element according to claim 1, wherein the cylindrical end fittings have a greater inside diameter than the majority of the remaining length of the tube element.

14. The tube element according to claim 1 wherein the corrugated bellows has a number of external and internal crests, and at least the first external crest of the bellows which is situated next to the respective cylindrical end fitting has a reduced outside diameter, said reduced diameter being located approximately between the outside diameter of the remaining corrugated section of the bellows and the outside diameter of the respective cylindrical end fitting.

15. The tube element according to claim 1, wherein the exterior braiding hose is made of corrosion-resistant material or is coated with a corrosion-resistant or temperature-resistant material.

16. The tube element according to claim 15, wherein the coating material has sliding characteristics.

17. The tube element according to claim 1, wherein the exterior braiding hose is manufactured with the addition of glass fibers and/or is coated with a glass-fiber braiding.

18. The tube element according to claim 1, wherein exterior braiding hose is manufactured from spring wire, ceramic fibers and/or plastic material of high thermal resistance.

19. The tube element according to claim 1, wherein said at least one bellows includes two bellows in axial sequence, and said tube element further comprises an intermediate plain section which is situated between the two bellows, the inside diameter of the plain section generally corresponding with the free inside diameter of the adjacent bellows.

20. The tube element according to claim 1, wherein the bellows is connected with the exterior braiding hose at least at one end.

21. The tube element according to claim 1 wherein the exterior braiding hose is connected at a distance to the end fittings of the tube element.

* * * * *